(12) United States Patent
Stueven et al.

(10) Patent No.: US 7,967,148 B2
(45) Date of Patent: Jun. 28, 2011

(54) METHOD FOR GRADING WATER-ABSORBENT POLYMER PARTICLES

(75) Inventors: Uwe Stueven, Bad Soden (DE); Rüdiger Funk, Niedernhausen (DE); Matthias Weismantel, Jossgrund-Oberndorf (DE); Karl J. Possemiers, Gravenwezel (BE); Filip Mees, Grobbendonk (BE)

(73) Assignee: BASF SE, Ludwigshafen (DE)

( * ) Notice: Subject to any disclaimer, the term of this patent is extended or adjusted under 35 U.S.C. 154(b) by 99 days.

(21) Appl. No.: 12/438,486

(22) PCT Filed: Sep. 24, 2007

(86) PCT No.: PCT/EP2007/060073
§ 371 (c)(1),
(2), (4) Date: Feb. 23, 2009

(87) PCT Pub. No.: WO2008/037673
PCT Pub. Date: Apr. 3, 2008

(65) Prior Publication Data
US 2009/0194462 A1    Aug. 6, 2009

(30) Foreign Application Priority Data

Sep. 25, 2006  (EP) .................................... 06121230

(51) Int. Cl.
*B07B 1/00* (2006.01)
(52) U.S. Cl. ............. 209/235; 209/11; 209/17; 209/32; 209/522; 209/388; 525/375; 521/31
(58) Field of Classification Search .................... 209/21, 209/235, 292, 313, 315; 525/375
See application file for complete search history.

(56) References Cited

U.S. PATENT DOCUMENTS

| 2,683,533 | A | * | 7/1954 | Paul ............................... 209/388 |
| 3,061,095 | A | * | 10/1962 | O'Malley ........................ 209/17 |
| 3,620,368 | A | * | 11/1971 | Comis et al. .................... 209/52 |
| 4,192,920 | A | * | 3/1980 | Amick ............................. 521/31 |
| 6,164,455 | A | * | 12/2000 | Kakita et al. .................... 209/11 |
| 2007/0161759 | A1 | * | 7/2007 | Riegel et al. ................... 525/375 |
| 2008/0202987 | A1 | * | 8/2008 | Weismantel et al. ........... 209/32 |

FOREIGN PATENT DOCUMENTS

| DE | 10 2005 001 789 | | 7/2006 |
| EP | 0 855 232 | | 7/1998 |
| JP | 2003-320308 | | 11/2003 |
| JP | 2003320308 | A * | 11/2003 |
| WO | WO-92/18171 | | 10/1992 |
| WO | WO-2005/080479 | | 9/2005 |
| WO | WO-2006/074816 | | 7/2006 |

OTHER PUBLICATIONS

Buccholz et al., *Modern Superabsorbent Polymer Technology*, Wiley-VCH, pp. 71-103 (1998).
International Search Report and Written Opinion in PCT/EP2007/060073 dated Feb. 1, 2008.
Wessel, *Ulmanns Encyclopädie der technischen Chemie*, 4th edition, Verlag Chemie, Weinheim, v.2, pp. 34-56 (1972).

* cited by examiner

*Primary Examiner* — Terrell H Matthews
(74) *Attorney, Agent, or Firm* — Marshall, Gerstein & Borun LLP

(57) ABSTRACT

A process for classifying water-absorbing polymer beads, wherein screens having different mesh sizes are used before and after the postcrosslinking to remove the oversize.

17 Claims, No Drawings

METHOD FOR GRADING WATER-ABSORBENT POLYMER PARTICLES

CROSS-REFERENCE TO RELATED APPLICATIONS

This is the U.S. national phase of International Application No. PCT/EP2007/060073, filed Sep. 24, 2007, which claims the benefit of European Patent Application No. 06121230.4, filed Sep. 25, 2006.

The present invention relates to a process for classifying water-absorbing polymer beads, wherein screens having different mesh sizes are used before and after the post-crosslinking to remove the oversize.

The production of water-absorbing polymer beads is described in the monograph "Modern Superabsorbent Polymer Technology", F. L. Buchholz and A. T. Graham, Wiley-VCH, 1998, pages 71 to 103.

As products which absorb aqueous solutions, water-absorbing polymers are used for the production of diapers, tampons, sanitary napkins and other hygiene articles, but also as water-retaining agents in market gardening.

The properties of the water-absorbing polymers can be adjusted via the degree of crosslinking. With increasing degree of crosslinking, the gel strength rises and the centrifuge retention capacity (CRC) falls.

To improve the use properties, for example saline flow conductivity (SFC) in the diaper and absorbency under load (AUL), water-absorbing polymer beads are generally postcrosslinked. This increases only the degree of crosslinking of the particle surface, which allows absorbency under load (AUL) and centrifuge retention capacity (CRC) to be at least partly decoupled. This postcrosslinking can be performed in the aqueous gel phase. However, dried, ground and screened-off polymer beads (base polymer) are preferably coated on the surface with a postcrosslinker, thermally postcrosslinked and dried. Crosslinkers suitable for this purpose are compounds which comprise at least two groups which can form covalent bonds with the carboxylate groups of the hydrophilic polymer.

The water-absorbing polymers are used as a pulverulent, particulate product preferably in the hygiene sector. Here, for example, particle sizes between 200 and 850 µm are used and the particulate polymer material is classified to these particle sizes actually in the course of the production process. In this case, continuous screening machines with two screens are used, the screens used having the mesh sizes of 200 and 850 µm. Beads having a particle size of up to 200 µm fall through both screens and are collected as undersize at the bottom of the screening machine. Beads having a particle size of greater than 850 µm remain on the uppermost screen as oversize and are discharged. The product fraction having a particle size of greater than 200 to 850 µm is removed as midsize between the two screens of the screening machine. Depending on the screening quality, each particle size fraction still comprises a proportion of particles with the wrong particle size as erroneous discharge. For example, the oversize fraction may also comprise a proportion of particles having a particle size of 850 µm or less.

Discharged undersize and oversize is typically recycled into the production. The undersize can be added, for example, to the polymerization. The oversize is typically comminuted, which inevitably also leads to the occurrence of further undersize.

In the conventional classifying operations, different problems occur when particular polymers are classified. The most frequent problem is the blockage of the screen surface and the deterioration in the classifying efficiency and the classifying ability. A further problem is the caking tendency of the product which leads to undesired agglomerates before, after and during the screening. The process step of screening therefore cannot be performed such that it is free of disruptions, often accompanied by unwanted shutdowns in polymer production. Such disruptions are found to be particularly problematic in the continuous production process. The overall result is, however, insufficient separation efficiency in the screening. These problems are observed in particular in the classification of postcrosslinked product.

A higher screening quality is typically achieved by adding substances to the product which serve to increase the free flow and/or the mechanical stability of the polymer powder. In general, a free-flowing product is achieved when assistants, for example surfactants, which prevent mutual adhesion of the individual particles, are added to the polymer powder, usually after the drying and/or in the course of the postcrosslinking. In other cases, attempts are made to influence the caking tendencies by process technology measures.

In order to achieve higher separation efficiencies without further product additives, improvements by virtue of alternative screening units have been proposed. For instance, higher separation efficiencies are achieved when screen orifice areas are driven in spiral form. This is, for example, the case in tumbling screen machines. When, however, the throughput of such screening apparatus is increased, the above problems are enhanced, and it becomes ever more impossible to maintain the high classifying capability.

The addition of screening aids such as screening balls, PVC friction rings, Teflon-friction rings or rubber cubes on the screen surface only helps insignificantly to improve the separation efficiency. Particularly in the case of amorphous polymer material, such as water-absorbing polymer beads, this can cause increased attrition.

A general overview of classification can be found, for example, in Ullmanns Encyklopädie der technischen Chemie, 4th edition, volume 2, pages 43 to 56, Verlag Chemie, Weinheim, 1972.

EP 855 232 A2 describes a classification process for water-absorbing polymers. Use of heated or thermally insulated screens allows agglomerates below the screen to be avoided, especially in the case of small particle sizes.

DE 10 2005 001 789 A1 describes a classification process which is performed at reduced pressure.

JP 2003/320308 A describes a process in which agglomerates are avoided by virtue of warm air flowing toward the screen underside.

WO 92/18171 A1 describes the addition of inorganic powders as a screening assistant.

It is an object of the present invention to provide an improved classifying process for the production of water-absorbing polymer beads.

This object is achieved by a process for preparing water-absorbing polymer beads, comprising
   i) classification of the water-absorbing polymer beads, the oversize being removed by means of at least one screen and the screen, or, in the case of several screens, the screen with the smallest mesh size, having the mesh size $m_1$,
   ii) postcrosslinking of the classified polymer beads and
   iii) classification of the postcrosslinked polymer beads, the oversize being removed by means of at least one screen and the screen, or, in the case of several screens, the screen with the smallest mesh size, having the mesh size $m_2$,
wherein $m_2$ is greater than $m_1$.

Oversize refers here to a sieve cut which has a greater mean particle size in comparison to the target product. The oversize may also consist of a plurality of sieve cuts which satisfy this condition.

The invention is based on the finding that the postcrosslinking forms only very few agglomerates with slightly increased particle size. When, for example, particles having a particle size of greater than 850 µm have been removed before the postcrosslinking, the postcrosslinked product comprises only very few particles having a particle size in the range from greater than 850 to 1000 µm. In this context, a particle having a particle size of 850 µm is a particle which can still just pass through a screen having a mesh size of 850 µm.

This enables the use of screens having enlarged mesh size in the removal of the oversize after the postcrosslinking. This measure firstly allows the specification of particles having large particle sizes in the middle particle fraction, for example at most 1% by weight having a particle size of above 850 µm, to be maintained, and the incorrect discharge in the oversize fraction and hence the unavoidable occurrence of undersize in the recycling are secondly considerably reduced.

The screening result may, especially at high throughputs, be improved further when the oversize is removed by means of at least two screens of different mesh sizes.

The mesh size $m_1$ is typically at least 600 µm, preferably at least 700 µm, preferentially at least 750 µm, more preferably at least 800 µm, most preferably at least 850 µm.

The mesh size $m_2$ is typically at least 800 µm, preferably at least 850 µm, preferentially at least 900 µm, more preferably at least 950 µm, most preferably at least 1000 µm.

The mesh size $m_2$ is typically at least 50 µm, preferably at least 100 µm, preferentially at least 120 µm, more preferably at least 140 µm, most preferably at least 150 µm, greater than the mesh size $m_1$.

During the classification, the water-absorbing polymer beads preferably have a temperature of from 40 to 120° C., more preferably from 45 to 100° C., most preferably from 50 to 80° C.

In a preferred embodiment of the present invention, classification is effected under reduced pressure. The pressure is preferably 100 mbar less than ambient pressure.

The classification process according to the invention is particularly advantageously performed continuously. The throughput of water-absorbing polymer is typically at least 100 kg/m²·h, preferably at least 150 kg/m²·h, preferentially at least 200 kg/m²·h, more preferably at least 250 kg/m²·h, most preferably at least 300 kg/m²·h.

The water-absorbing resin is preferably flowed over with a gas stream, more preferably air, during the classification. The gas rate is typically from 0.1 to 10 m³/h per m² of screen area, preferably from 0.5 to 5 m³/h per m² of screen area, more preferably from 1 to 3 m³/h per m² of screen area, the gas volume being measured under standard conditions (25° C. and 1 bar). The gas stream is more preferably heated before entry into the screen apparatus, typically to a temperature of from 40 to 120° C., preferably to a temperature of from 50 to 110° C., preferentially to a temperature of from 60 to 100° C., more preferably to a temperature of from 65 to 90° C., most preferably to a temperature of from 70 to 80° C. The water content of the gas stream is typically less than 5 g/kg, preferably less than 4.5 g/kg, preferentially less than 4 g/kg, more preferably less than 3.5 g/kg, most preferably less than 3 g/kg. A gas stream with low water content can be obtained, for example, by condensing an appropriate amount of water out of a gas stream with relatively high water content by cooling.

In a preferred embodiment of the present invention, a plurality of screening machines are operated in parallel.

The screening machines are typically electrically grounded.

As a result of use of the classification process according to the invention, the proportion of particles having a particle size of less than or equal to $m_1$ is typically less than 50% by weight, preferably less than 45% by weight, preferentially less than 40% by weight, more preferably less than 35% by weight, most preferably less than 30% by weight.

The present invention therefore further provides a process for continuously preparing water-absorbing polymer beads, comprising i) classification of the water-absorbing polymer beads, the oversize being removed by means of at least one screen and the screen, or, in the case of several screens, the screen with the smallest mesh size, having the mesh size $m_1$, ii) postcrosslinking of the classified polymer beads and iii) classification of the postcrosslinked polymer beads, wherein the oversize removed in step iii) comprises less than 50% by weight of particles having a particle size smaller than or equal to $m_1$ and the throughput in step iii) is at least 100 kg/m²·h.

The screening apparatus suitable for the classification process according to the invention are subject to no restriction; preference is given to planar screening processes; very particular preference is given to tumbling screen machines. The screening apparatus is typically agitated to support the classification. This is preferably done in such a way that the material to be classified is conducted in spiral form over the screen. This forced vibration typically has an amplitude of from 0.7 to 40 mm, preferably from 1.5 to 25 mm, and a frequency of from 1 to 100 Hz, preferably from 5 to 10 Hz.

The water-absorbing polymer beads to be used in the process according to the invention may be produced by polymerizing monomer solutions comprising at least one ethylenically unsaturated monomer a), optionally at least one crosslinker b), at least one initiator c) and water d).

The monomers a) are preferably water-soluble, i.e. the solubility in water at 23° C. is typically at least 1 g/100 g of water, preferably at least 5 g/100 g of water, more preferably at least 25 g/100 g of water, most preferably at least 50 g/100 g of water, and preferably have at least one acid group each.

Suitable monomers a) are, for example, ethylenically unsaturated carboxylic acids such as acrylic acid, methacrylic acid, maleic acid, fumaric acid and itaconic acid. Particularly preferred monomers are acrylic acid and methacrylic acid. Very particular preference is given to acrylic acid.

The preferred monomers a) have at least one acid group, the acid groups preferably having been at least partly neutralized.

The proportion of acrylic acid and/or salts thereof in the total amount of monomers a) is preferably at least 50 mol %, more preferably at least 90 mol % and most preferably at least 95 mol %.

The monomers a), especially acrylic acid, comprise preferably up to 0.025% by weight of a hydroquinone monoether. Preferred hydroquinone monoethers are hydroquinone monomethyl ether (MEHQ) and/or tocopherols.

Tocopherol is understood to mean compounds of the following formula

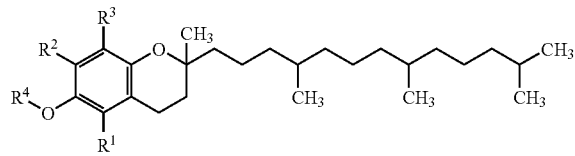

where $R^1$ is hydrogen or methyl, $R^2$ is hydrogen or methyl, $R^3$ is hydrogen or methyl, and $R^4$ is hydrogen or an acyl radical having from 1 to 20 carbon atoms.

Preferred radicals for $R^4$ are acetyl, ascorbyl, succinyl, nicotinyl and other physiologically compatible carboxylic acids. The carboxylic acids may be mono-, di- or tricarboxylic acids.

Preference is given to alpha-tocopherol where $R^1=R^2=R^3=$methyl, in particular racemic alpha-tocopherol. $R^1$ is more preferably hydrogen or acetyl. RRR-alpha-tocopherol is especially preferred.

The monomer solution comprises preferably at most 130 ppm by weight, more preferably at most 70 ppm by weight, preferably at least 10 ppm by weight, more preferably at least 30 ppm by weight, in particular around 50 ppm by weight, of hydroquinone monoether, based in each case on acrylic acid, acrylic acid salts also being considered as acrylic acid. For example, the monomer solution can be prepared by using acrylic acid having an appropriate content of hydroquinone monoether.

The crosslinkers b) are compounds having at least two polymerizable groups which can be polymerized by a free-radical mechanism into the polymer network. Suitable crosslinkers b) are, for example, ethylene glycol dimethacrylate, diethylene glycol diacrylate, allyl methacrylate, trimethylolpropane triacrylate, triallylamine, tetraallyloxyethane, as described in EP 530 438 A1, di- and triacrylates, as described in EP 547 847 A1, EP 559 476 A1, EP 632 068 A1, WO 93/21237 A1, WO 2003/104299 A1, WO 2003/104300 A1, WO 2003/104301 A1 and in DE 103 31 450 A1, mixed acrylates which, as well as acrylate groups, comprise further ethylenically unsaturated groups, as described in DE 103 31 456 A1 and DE 103 55 401 A1, or crosslinker mixtures, as described, for example, in DE 195 43 368 A1, DE 196 46 484 A1, WO 90/15830 A1 and WO 2002/32962 A2.

Suitable crosslinkers b) are in particular N,N'-methylenebisacrylamide and N,N'-methylenebismethacrylamide, esters of unsaturated mono- or polycarboxylic acids of polyols, such as diacrylate or triacrylate, for example butanediol diacrylate, butanediol dimethacrylate, ethylene glycol diacrylate or ethylene glycol dimethacrylate, and also trimethylolpropane triacrylate and allyl compounds such as allyl (meth)acrylate, triallyl cyanurate, diallyl maleate, polyallyl esters, tetraallyloxyethane, triallylamine, tetraallylethylenediamine, allyl esters of phosphoric acid and vinylphosphonic acid derivatives, as described, for example, in EP 343 427 A2. Further suitable crosslinkers b) are pentaerythritol diallyl ether, pentaerythritol triallyl ether and pentaerythritol tetraallyl ether, polyethylene glycol diallyl ether, ethylene glycol diallyl ether, glycerol diallyl ether and glycerol triallyl ether, polyallyl ethers based on sorbitol, and ethoxylated variants thereof. In the process according to the invention, it is possible to use di(meth)acrylates of polyethylene glycols, the polyethylene glycol used having a molecular weight between 100 and 1000.

However, particularly advantageous crosslinkers b) are di- and triacrylates of 3- to 20-tuply ethoxylated glycerol, of 3- to 20-tuply ethoxylated trimethylolpropane, of 3- to 20-tuply ethoxylated trimethylolethane, in particular di- and triacrylates of 2- to 6-tuply ethoxylated glycerol or of 2- to 6-tuply ethoxylated trimethylolpropane, of 3-tuply propoxylated glycerol or of 3-tuply propoxylated trimethylolpropane, and also of 3-tuply mixed ethoxylated or propoxylated glycerol or of 3-tuply mixed ethoxylated or propoxylated trimethylolpropane, of 15-tuply ethoxylated glycerol or of 15-tuply ethoxylated trimethylolpropane, and also of at least 40-tuply ethoxylated glycerol, of at least 40-tuply ethoxylated trimethylolethane or of at least 40-tuply ethoxylated trimethylolpropane.

Very particularly preferred crosslinkers b) are the polyethoxylated and/or -propoxylated glycerols which have been esterified with acrylic acid or methacrylic acid to give di- or triacrylates, as described, for example, in WO 2003/104301 A1. Di- and/or triacrylates of 3- to 10-tuply ethoxylated glycerol are particularly advantageous. Very particular preference is given to di- or triacrylates of 1- to 5-tuply ethoxylated and/or propoxylated glycerol. Most preferred are the triacrylates of 3- to 5-tuply ethoxylated and/or propoxylated glycerol.

The amount of crosslinkers b) is preferably from 0.01 to 5% by weight, more preferably from 0.05 to 2% by weight, most preferably from 0.1 to 1% by weight, based in each case on the monomer solution.

The initiators c) used may be all compounds which disintegrate into free radicals under the polymerization conditions, for example peroxides, hydroperoxides, hydrogen peroxide, persulfates, azo compounds and redox initiators. Preference is given to the use of water-soluble initiators. In some cases, it is advantageous to use mixtures of various initiators, for example mixtures of hydrogen peroxide and sodium or potassium peroxodisulfate. Mixtures of hydrogen peroxide and sodium peroxodisulfate can be used in any proportion.

Particularly preferred initiators c) are azo initiators such as 2,2'-azobis[2-(2-imidazolin-2-yl)propane]dihydrochloride and 2,2'-azobis[2-(5-methyl-2-imidazolin-2-yl)propane]dihydrochloride, and photoinitiators such as 2-hydroxy-2-methylpropio-phenone and 1-[4-(2-hydroxyethoxy)phenyl]-2-hydroxy-2-methyl-1-propan-1-one, redox initiators such as sodium persulfate/hydroxymethylsulfinic acid, ammonium peroxodisulfate/hydroxy-methylsulfinic acid, hydrogen peroxide/hydroxymethylsulfinic acid, sodium persulfate/ascorbic acid, ammonium peroxodisulfate/ascorbic acid and hydrogen peroxide/ascorbic acid, photoinitiators such as 1-[4-(2-hydroxyethoxy)-phenyl]-2-hydroxy-2-methyl-1-propan-1-one, and mixtures thereof.

The initiators are used in customary amounts, for example in amounts of from 0.001 to 5% by weight, preferably from 0.01 to 1% by weight, based on the monomers a). For optimal action, the preferred polymerization inhibitors require dissolved oxygen. Therefore, the monomer solution can be freed of dissolved oxygen before the polymerization by inertization, i.e. flowing through with an inert gas, preferably nitrogen. The oxygen content of the monomer solution is preferably lowered before the polymerization to less than 1 ppm by weight, more preferably to less than 0.5 ppm by weight.

The preparation of a suitable polymer and also further suitable hydrophilic ethylenically unsaturated monomers a) are described in DE 199 41 423 A1, EP 686 650 A1, WO 2001/45758 A1 and WO 2003/104300 A1.

Suitable reactors are kneading reactors or belt reactors. In the kneader, the polymer gel formed in the polymerization of an aqueous monomer solution is comminuted continuously by, for example, contrarotatory stirrer shafts, as described in WO 2001/38402 A1. The polymerization on the belt is described, for example, in DE 38 25 366 A1 and U.S. Pat. No. 6,241,928. Polymerization in a belt reactor forms a polymer gel which has to be comminuted in a further process step, for example in a meat grinder, extruder or kneader.

Advantageously, the hydrogel, after leaving the polymerization reactor, is then stored, for example in insulated vessels, at elevated temperature, preferably at least 50° C., more preferably at least 70° C., most preferably at least 80° C., and preferably less than 100° C. The storage, typically for from 2 to 12 hours, further increases the monomer conversion.

In the case of relatively high monomer conversions in the polymerization reactor, the storage can also be shortened significantly or a storage can be dispensed with.

The acid groups of the resulting hydrogels have typically been partially neutralized, preferably to an extent of from 25 to 95 mol %, more preferably to an extent of from 50 to 80 mol %, and even more preferably to an extent of from 60 to 75 mol %, for which the customary neutralizing agents can be used, preferably alkali metal hydroxides, alkali metal oxides, alkali metal carbonates or alkali metal hydrogencarbonates and also mixtures thereof. Instead of alkali metal salts, it is also possible to use ammonium salts. Particularly preferred alkali metals are sodium and potassium, but very particular preference is given to sodium hydroxide, sodium carbonate or sodium hydrogencarbonate and also mixtures thereof.

Neutralization is preferably carried out at the monomer stage. It is done typically by mixing in the neutralizing agent as an aqueous solution, as a melt, or else preferably as a solid material. For example, sodium hydroxide having a water content of distinctly below 50% by weight can be present as a waxy mass having a melting point of above 23° C. In this case, metering as piece material or melt at elevated temperature is possible.

However, it is also possible to carry out neutralization after the polymerization, at the hydrogel stage. It is also possible to neutralize up to 40 mol %, preferably from 10 to 30 mol % and more preferably from 15 to 25 mol % of the acid groups before the polymerization by adding a portion of the neutralizing agent actually to the monomer solution and setting the desired final degree of neutralization only after the polymerization, at the hydrogel stage. When the hydrogel is neutralized at least partly after the polymerization, the hydrogel is preferably comminuted mechanically, for example by means of a meat grinder, in which case the neutralizing agent can be sprayed, sprinkled or poured on and then carefully mixed in. To this end, the gel mass obtained can be repeatedly ground in a meat grinder for homogenization.

The hydrogel is then preferably dried with a belt dryer until the residual moisture content is preferably below 15% by weight and especially below 10% by weight, the water content being determined by EDANA (European Disposables and Nonwovens Association) recommended test method No. 430.2-02 "Moisture content". If desired, however, drying can also be carried out using a fluidized bed dryer or a heated plowshare mixer. To obtain particularly white products, it is advantageous to dry this gel while ensuring rapid removal of the evaporating water. To this end, the dryer temperature must be optimized, the air feed and removal has to be controlled, and sufficient venting must be ensured in each case. The higher the solids content of the gel, the simpler the drying, by its nature, and the whiter the product. The solids content of the gel before the drying is therefore preferably between 30% and 80% by weight. It is particularly advantageous to vent the dryer with nitrogen or another nonoxidizing inert gas. If desired, however, it is also possible simply just to lower the partial pressure of the oxygen during the drying in order to prevent oxidative yellowing processes.

Thereafter, the dried hydrogel is ground and classified, and the apparatus used for grinding may typically be single- or multistage roll mills, preferably two- or three-stage roll mills, pin mills, hammer mills or vibratory mills.

The mean particle size of the polymer beads removed as the product fraction is preferably at least 200 μm, more preferably from 250 to 600 μm, very particularly from 300 to 500 μm. The mean particle size of the product fraction may be determined by means of the EDANA (European Disposables and Nonwovens Association) recommended test method No. 420.2-02 "Particle size distribution", where the proportions by mass of the screen fractions are plotted in cumulated form and the mean particle size is determined graphically. The mean particle size here is the value of the mesh size which gives rise to a cumulative 50% by weight.

The water-absorbing polymer beads have a centrifuge retention capacity (CRC) of typically at least 15 g/g, preferably at least 20 μg, preferentially at least 25 g/g, more preferably at least 30 g/g, most preferably at least 35 g/g. The centrifuge retention capacity (CRC) of the water-absorbing polymer beads is typically less than 60 g/g, the centrifuge retention capacity (CRC) being determined by the EDANA (European Disposables and Nonwovens Association) recommended test method No. 441.2-02 "Centrifuge retention capacity".

To further improve the properties, the polymer beads are postcrosslinked. Suitable postcrosslinkers are compounds which comprise groups which can form covalent bonds with the at least two carboxylate groups of the hydrogel. Suitable compounds are, for example, alkoxysilyl compounds, polyaziridines, polyamines, polyamidoamines, di- or polyepoxides, as described in EP 83 022 A2, EP 543 303 A1 and EP 937 736 A2, di- or polyfunctional alcohols, as described in DE 33 14 019 A1, DE 35 23 617 A1 and EP 450 922 A2, or β-hydroxyalkylamides, as described in DE 102 04 938 A1 and U.S. Pat. No. 6,239,230.

Additionally described as suitable postcrosslinkers are cyclic carbonates in DE 40 20 780 C1,2-oxazolidone and its derivatives, such as 2-hydroxyethyl-2-oxazolidone, in DE 198 07 502 A1, bis- and poly-2-oxazolidinones in DE 198 07 992 C1,2-oxotetrahydro-1,3-oxazine and its derivatives in DE 198 54 573 A1, N-acyl-2-oxazolidones in DE 198 54 574 A1, cyclic ureas in DE 102 04 937 A1, bicyclic amide acetals in DE 103 34 584 A1, oxetanes and cyclic ureas in EP 1 199 327 A2 and morpholine-2,3-dione and its derivatives in WO 2003/31482 A1.

In addition, it is also possible to use postcrosslinkers which comprise additional polymerizable ethylenically unsaturated groups, as described in DE 37 13 601 A1.

The amount of postcrosslinker is preferably from 0.01 to 1% by weight, more preferably from 0.05 to 0.5% by weight, most preferably from 0.1 to 0.2% by weight, based in each case on the polymer.

In a preferred embodiment of the present invention, polyvalent cations are applied to the particle surface in addition to the postcrosslinkers.

The polyvalent cations usable in the process according to the invention are, for example, divalent cations such as the cations of zinc, magnesium, calcium and strontium, trivalent cations such as the cations of aluminum, iron, chromium, rare earths and manganese, tetravalent cations such as the cations of titanium and zirconium. Possible counterions are chloride, bromide, sulfate, hydrogensulfate, carbonate, hydrogencarbonate, nitrate, phosphate, hydrogenphosphate, dihydrogenphosphate and carboxylate, such as acetate and lactate. Aluminum sulfate is preferred. Apart from metal salts, it is also possible to use polyamines as polyvalent cations.

The amount of polyvalent cation used is, for example, from 0.001 to 0.5% by weight, preferably from 0.005 to 0.2% by weight, more preferably from 0.02 to 0.1% by weight, based in each case on the polymer.

The postcrosslinking is typically performed in such a way that a solution of the postcrosslinker is sprayed onto the hydrogel or the dry polymer beads. The spraying is followed by thermal drying, and the postcrosslinking reaction can take place either before or during the drying.

The spraying of a solution of the crosslinker is preferably performed in mixers with moving mixing tools, such as screw mixers, paddle mixers, disk mixers, plowshare mixers and shovel mixers. Particular preference is given to vertical mixers, very particular preference to plowshare mixers and shovel mixers. Suitable mixers are, for example, Lödige mixers, Bepex mixers, Nauta mixers, Processall mixers and Schugi mixers.

The thermal drying is preferably carried out in contact dryers, more preferably paddle dryers, most preferably disk dryers. Suitable dryers are, for example, Bepex dryers and Nara dryers. Moreover, it is also possible to use fluidized bed dryers.

The drying can be effected in the mixer itself, by heating the jacket or blowing in warm air. Equally suitable is a downstream dryer, for example a staged dryer, a rotary tube oven or a heatable screw. It is particularly advantageous to mix and dry in a fluidized bed dryer.

Preferred drying temperatures are in the range from 100 to 250° C., preferably from 120 to 220° C. and more preferably from 130 to 210° C. The preferred residence time at this temperature in the reaction mixer or dryer is preferably at least 10 minutes, more preferably at least 20 minutes, most preferably at least 30 minutes.

Subsequently, the postcrosslinked polymer is classified again.

The mean diameter of the polymer beads removed as the product fraction is preferably at least 200 μm, more preferably from 250 to 600 μm, very particularly from 300 to 500 μm. 90% of the polymer beads have a diameter of preferably from 100 to 800 μm, more preferably from 150 to 700 μm, most preferably from 200 to 600 μm.

EXAMPLES

Comparative Example

By continuously mixing water, 50% by weight sodium hydroxide solution and acrylic acid, a 38.8% by weight acrylic acid/sodium acrylate solution was prepared, such that the degree of neutralization was 71.3 mol %. After the mixing of the components, the monomer solution was cooled continuously by a heat exchanger.

The ethylenically polyunsaturated crosslinker used is polyethylene glycol-400 diacrylate (diacrylate of a polyethylene glycol having a mean molar mass of 400 g/mol). The amount used was 2 kg per t of monomer solution.

To initiate the free-radical polymerization, the following components were used: hydrogen peroxide (1.03 kg (0.25% strength by weight) per t of monomer solution), sodium peroxodisulfate (3.10 kg (15% strength by weight) per t of monomer solution) and ascorbic acid (1.05 kg (1% strength by weight) per t of monomer solution).

The throughput of the monomer solution was 20 t/h.

The individual components were metered continuously into a List Contikneter continuous kneader with capacity 6.3 m³ (from List, Arisdorf, Switzerland) in the following amounts:

| 20 t/h | of monomer solution |
|---|---|
| 40 kg/h | of polyethylene glycol-400 diacrylate |
| 82.6 kg/h | of hydrogen peroxide solution/sodium peroxodisulfate solution |
| 21 kg/h | of ascorbic acid solution |

Between the addition points for crosslinker and initiators, the monomer solution was inertized with nitrogen.

At the end of the reactor, 1000 kg/h of removed undersize having a particle size of less than 150 μm were additionally metered in.

At the feed, the reaction solution had a temperature of 23.5° C. The reactor was operated with a rotational speed of the shafts of 38 rpm. The residence time of the reaction mixture in the reactor was 15 minutes.

After polymerization and gel comminution, the aqueous polymer gel was introduced into a belt dryer. The residence time on the dryer belt was approx. 37 minutes.

The dried hydrogel was ground and screened. The fraction having the particle size from 150 to 850 μm was postcrosslinked.

The postcrosslinker solution was sprayed onto the polymer beads in a Schugi mixer (from Hosokawa-Micron B.V., Doetichem, the Netherlands). The postcrosslinker solution was a 2.7% by weight solution of ethylene glycol diglycidyl ether in propylene glycol/water (weight ratio 1:3).

The following amounts were metered in:

| 7.5 t/h | of water-absorbing polymer beads (base polymer) |
|---|---|
| 308.25 kg/h | of postcrosslinker solution |

This was followed by drying and postcrosslinking in a NARA paddle dryer (from GMF Gouda, Waddinxveen, the Netherlands) at 150° C. for 60 minutes.

The postcrosslinked polymer beads were cooled to 60° C. in a NARA paddle dryer (from GMF Gouda, Waddinxveen, the Netherlands).

The cooled polymer beads were screened continuously in a tumbling screen machine (Allgaier Werke GmbH, Uhingen, Germany) with three screen decks. The screens had a diameter of 260 cm in each case and had, from the bottom upward, a mesh size of 150 μm, 500 μm, 850 μm and 1000 μm. The screen fractions from the screens with the mesh sizes of 150 μm and 500 μm were combined to give the midsize fraction. The screen fractions from the screens with the mesh sizes of 850 μm and 1000 μm were combined and recycled as oversize. A total of from 0.9 to 1.4 t/h of oversize were obtained.

The particle size distribution of the combined midsize fraction was determined by the EDANA (European Disposables and Nonwovens Association) recommended test method no. 420.2-02 "Particle size distribution". The combined midsize fraction comprised 0.14% by weight of particles having a particle size of over 850 μm and 24.7% by weight of particles having a particle size of from over 600 to 850 μm.

In addition, the particle size distribution of the combined oversize fraction was determined. To this end, two samples were taken at different times. The result is compiled in the table.

Example

The procedure of the comparative example was repeated.

The cooled polymer beads were screened continuously in a tumbling screen machine (Allgaier Werke GmbH, Uhingen, Germany) with three screen decks. The screens had a diameter of 260 cm in each case and had, from the bottom upward, a mesh size of 150 µm, 500 µm, 1000 µm and 3000 µm. The screen fractions from the screens with the mesh sizes of 150 µm and 500 µm were combined to give the midsize fraction. The screen fractions from the screens with the mesh sizes of 1000 µm and 3000 µm were combined and recycled as oversize. A total of from 0.2 to 0.5 t/h of oversize were obtained.

The particle size distribution of the combined midsize fraction was determined by the EDANA (European Disposables and Nonwovens Association) recommended test method no. 420.2-02 "Particle size distribution". The combined midsize fraction comprised 0.31% by weight of particles having a particle size of over 850 µm and 31.7% by weight of particles having a particle size of from over 600 to 850 µm.

In addition, the particle size distribution of the combined oversize fraction was determined. To this end, two samples were taken at different times. The result is compiled in the table.

TABLE

Particle size distribution of the combined oversize after the postcrosslinking

| Particle size [µm] | Comparative example | | Example | |
| --- | --- | --- | --- | --- |
|  | Sample 1 | Sample 2 | Sample 1 | Sample 2 |
| >5000 | 0.5% by wt. | 0.1% by wt. | 0.0% by wt. | 0.5% by wt. |
| >4000-5000 | 0.6% by wt. | 0.1% by wt. | 0.0% by wt. | 0.6% by wt. |
| >3150-4000 | 0.2% by wt. | 0.1% by wt. | 0.0% by wt. | 0.9% by wt. |
| >2000-3150 | 0.5% by wt. | 0.2% by wt. | 0.0% by wt. | 4.1% by wt. |
| >1000-2000 | 1.3% by wt. | 0.7% by wt. | 6.8% by wt. | 19.4% by wt. |
| >850-1000 | 18.9% by wt. | 10.1% by wt. | 69.8% by wt. | 52.4% by wt. |
| ≦850 | 78.0% by wt. | 88.7% by wt. | 23.4% by wt. | 22.1% by wt. |
| >800-850 | 32.5% by wt. | 28.7% by wt. | 22.8% by wt. | 20.6% by wt. |
| >710-800 | 39.5% by wt. | 43.4% by wt. | 0.5% by wt. | 0.5% by wt. |
| >600-710 | 4.5% by wt. | 15.0% by wt. | 0.1% by wt. | 0.6% by wt. |
| >300-600 | 1.1% by wt. | 1.4% by wt. | 0.0% by wt. | 0.2% by wt. |
| >150-300 | 0.2% by wt. | 0.1% by wt. | 0.0% by wt. | 0.2% by wt. |
| ≦300 | 0.2% by wt. | 0.1% by wt. | 0.0% by wt. | 0.0% by wt. |

The table shows that the oversize removed in the process according to the invention comprises a considerably lower level of incorrect discharge.

The invention claimed is:

1. A process for preparing water-absorbing polymer beads, comprising
   i) classifying the water-absorbing polymer beads to provide classified polymer beads and oversize beads, the oversize beads being removed by means of at least one screen and the screen, or, in the case of several screens, the screen with a smallest mesh size, having a mesh size $m_1$,
   ii) postcrosslinking the classified polymer beads to provide postcrosslinked polymer beads, and
   iii) classifying the postcrosslinked polymer beads, oversize postcrosslinked beads being removed by means of at least one screen and the screen, or, in the case of several screens, a screen with the smallest mesh size, having a mesh size $m_2$,
   wherein $m_2$ is greater than $m_1$.

2. The process according to claim 1, wherein the oversize is removed in step i) by means of at least two screens of different mesh sizes.

3. The process according to claim 1, wherein the oversize is removed in step iii) by means of at least two screens of different mesh sizes.

4. The process according to claim 1, wherein the mesh size $m_1$ is at least 600 µm.

5. The process according to claim 1, wherein the mesh size $m_2$ is at least 800 µm.

6. The process according to claim 1, wherein the mesh size $m_2$ is at least 50 µm greater than the mesh size $m_1$.

7. The process according to claim 1, wherein the oversize is removed in step i) by means of at least two screens of different mesh sizes and at least one screen has a mesh size which is at least 50 µm greater than the mesh size $m_1$.

8. The process according to claim 1, wherein the oversize is removed in step iii) by means of at least two screens of different mesh sizes and at least one screen has a mesh size which is at least 500 um greater than the mesh size $m_2$.

9. The process according to claim 1, wherein the water-absorbing polymer beads, during the classification, have a temperature of at least 40° C.

10. The process according to claim 1, wherein classification is effected under reduced pressure.

11. The process according to claim 1, wherein a throughput per hour of water-absorbing polymer beads in the course of classification is at least 100 kg per m² of screen area.

12. The process according to claim 1, wherein the water-absorbing polymer beads are flowed over by a gas stream during the classification.

13. The process according to claim 12, wherein the gas stream has a temperature of from 40 to 120° C.

14. The process according to claim 12, wherein the gas stream has a steam content of less than 5 g/kg.

15. A process for continuously preparing water-absorbing polymer beads, comprising
   i) classifying the water-absorbing polymer beads, the oversize beads being removed by means of at least one screen and the screen, or, in the case of several screens, a screen with the smallest mesh size, having a mesh size $m_1$, ii) postcrosslinking of the classified polymer beads to provide postcrosslinked polymer beads, and
iii) classification of classifying the postcrosslinked polymer beads,
wherein oversize postcrosslinked beads removed in step iii) comprise less than 50% by weight of particles having a particle size smaller than or equal to $m_1$ and a throughput in step iii) is at least 100 kg/m²·h.

16. The process according to claim 1, wherein the water-absorbing polymer beads, before step ii), have a centrifuge retention capacity of at least 15 g/g.

17. The process according to claim 15, wherein the water-absorbing polymer beads, before step ii), have a centrifuge retention capacity of at least 15 g/g.

* * * * *